United States Patent
Kumar (10) Patent No.: US 7,756,903 B2
(45) Date of Patent: Jul. 13, 2010

(54) CONFIGURING A SEARCH ENGINE RESULTS PAGE WITH ENVIRONMENT-SPECIFIC INFORMATION

(75) Inventor: Amit Kumar, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 444 days.

(21) Appl. No.: 11/638,061

(22) Filed: Dec. 12, 2006

(65) Prior Publication Data
US 2008/0140806 A1 Jun. 12, 2008

(51) Int. Cl.
G06F 7/00 (2006.01)
(52) U.S. Cl. .................................................. 707/802
(58) Field of Classification Search .................. 707/100
See application file for complete search history.

(56) References Cited

U.S. PATENT DOCUMENTS

| | | |
|---|---|---|
| 6,643,661 B2 * | 11/2003 | Polizzi et al. ............... 707/100 |
| 2003/0051001 A1 * | 3/2003 | Calvo et al. ................. 709/218 |
| 2004/0073538 A1 * | 4/2004 | Leishman et al. ............. 707/3 |
| 2006/0085392 A1 * | 4/2006 | Wang et al. ................... 707/3 |
| 2006/0235816 A1 * | 10/2006 | Yang et al. ..................... 707/1 |
| 2007/0203889 A1 * | 8/2007 | Morgan ......................... 707/3 |
| 2007/0204216 A1 * | 8/2007 | Morgan ....................... 715/517 |
| 2008/0243821 A1 * | 10/2008 | Delli Santi et al. ............. 707/5 |

* cited by examiner

*Primary Examiner*—Don Wong
*Assistant Examiner*—Michael Le
(74) *Attorney, Agent, or Firm*—Hickman Palermo Truong & Becker LLP (57) ABSTRACT

An administrator for an environment may access an administration console to provide configuration information to tailor a search engine results page (SERP) for users in that environment. The administrator specifies which particular position on a SERP is to be reserved for environment specific information. The administrator may specify environment specific content that goes into a particular position. Rather than providing the content itself, the administrator might provide information to derive the environment specific content that goes into a particular position. The configuration information may be stored such that it is available for a search engine to configure a SERP with environment specific information. However, another device such as a proxy that is interposed between a client that issued the search query and the search engine may configure the SERP with environment specific information.

14 Claims, 6 Drawing Sheets

CONFIGURING A SEARCH ENGINE RESULTS PAGE WITH ENVIRONMENT-SPECIFIC INFORMATION

FIELD OF THE INVENTION

The present invention relates to computer systems, and more particularly to a user interface for specifying information to configure a search engine results page with environment specific information.

BACKGROUND

A search engine returns search results that match a search query submitted by a user. Typically, the search engine orders the search results based on algorithms currently in use by that particular search engine. The order usually takes the form of a "ranking", where the document with the highest ranking is the document considered most likely to satisfy the interest reflected in the search criteria specified by the user. Once the matching documents have been determined, and the display order of those documents has been determined, the search engine sends to the user that issued the search a "search results page" that presents information about the matching documents in the selected display order.

Typically, the search results page includes other information, such as advertisements. Search engines may determine what advertisements to include based on an analysis of keywords in the search query or analysis of search results in the search results page. For example, if the search query has the keyword "car", then advertisements relating to automobile dealers might be included in the search results page.

Thus, the search results page is typically the same for all users who submitted the search query to a particular search engine. Moreover, a given user will typically obtain the same search results whether the user submitted the search query from home, work, or another location.

In some cases, different users might receive somewhat different search results pages from each other, depending on information such as the zip code from which the search query is believed to have originated. For example, the selection of the advertisements might be based on a zip code associated with a user that entered the search query. This could allow advertisements to be limited to automobile dealers near the user's zip code. However, the user does not have control over the search experience because the search engine controls the user search experience.

Techniques also exist for third party providers of search result pages to provide a "look and feel" that is unique to that third party provider, even if the third party provider obtains the search results from the search engine. For example, the third party might be a news website that has a search box that is "powered by" a particular search engine. The news website has an agreement with the particular search engine that the news website is allowed to use the particular search engine to perform the search. The news website might configure the search engine results page with its own "look and feel." However, again the user does not have control over the search experience because the third party provider controls the user search experience.

Therefore, limitations exist with respect to the amount of control that a user, or the user's representative, can exert over the user's web search experience.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are disclosed herein to enrich a user's web search experience by allowing the user, or a representative of the user, to tailor the web search experience by configuring a search engine results page ("SERP") with environment specific information. Examples of environment specific information include, but are not limited to, advertisements, announcements, and domain specific search results. When a user submits a search query to a search engine from a particular environment, the search engine returns a SERP that is configured based on the environment specific information. Examples of environments include, but are not limited to, a home, a corporation, and an Internet café.

An administrator for an environment accesses an administration console to provide configuration information to tailor a SERP for users in that environment, in one embodiment. The administrator specifies which particular position on a SERP is to be reserved for environment specific information. The administrator may specify environment specific content that goes into a particular position. For example, an administrator for a corporate environment might provide advertisement copy for a delicatessen that is near the corporation. Rather than providing the content itself, the administrator might provide information to derive the environment specific content that goes into a particular position. For example, the administrator might provide a URL for a domain specific search. The configuration information may be stored such that they are available for a search engine to configure a SERP with environment specific information. However, another device such as a proxy that is interposed between the client that issued the search query and the search engine may configure the SERP with environment specific information.

In accordance with one embodiment, when a user issues a search query to a search engine, it is intercepted by a proxy that modifies the search query so that the search engine is aware that an environment specific SERP is desired. The search engine may insert environment specific information into the SERP or return a SERP with placeholders into which the proxy inserts environment specific information.

Many variations of the above are possible. Other embodiments for providing configuration information and configuring a SERP with environment specific information are disclosed herein.

Example Environment Specific Search Engine Results Page

Figure 1:
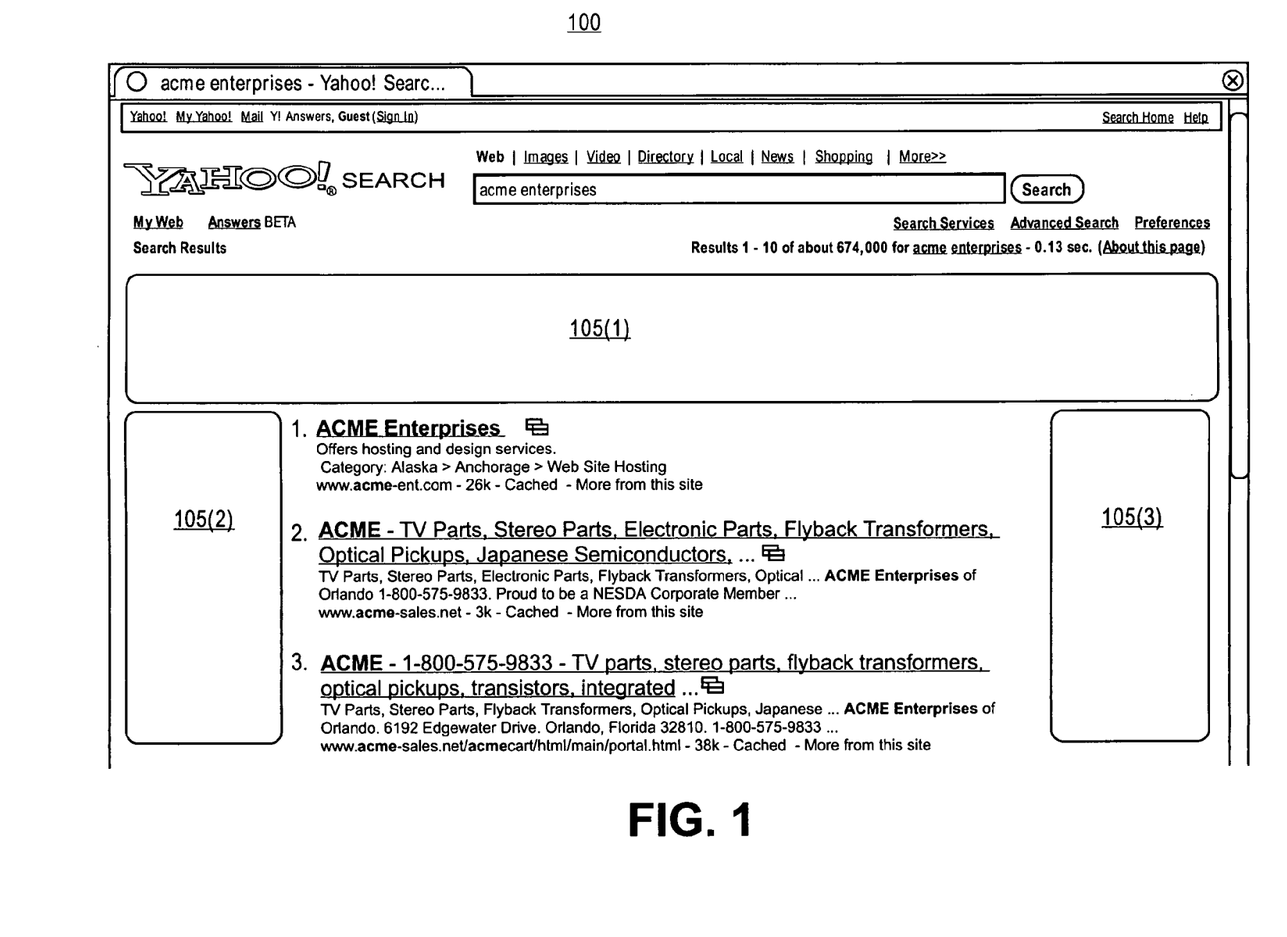
FIG. 1 is an example search engine results page having environment specific information, in accordance with an embodiment of the present invention.

As used herein, a SERP that has been configured with information that is specific to an environment from which the search query originated is referred to as "an environment specific SERP". FIG. 1 is an example environment specific SERP 100 showing example positions for environment specific information, in accordance with an embodiment of the present invention. The example environment specific SERP 100 has three positions 105(1), 105(2), 105(3) in which environment specific information might be located. The environment specific positions can be populated with, for example, advertisements, special notices, and domain specific searches. It is not required that all of the positions 105 contain environment specific information. The environment specific SERP 100 may have any number of positions 105 for environment specific information. The environment specific information may be positioned anywhere on the environment specific SERP 100.

Figure 2:
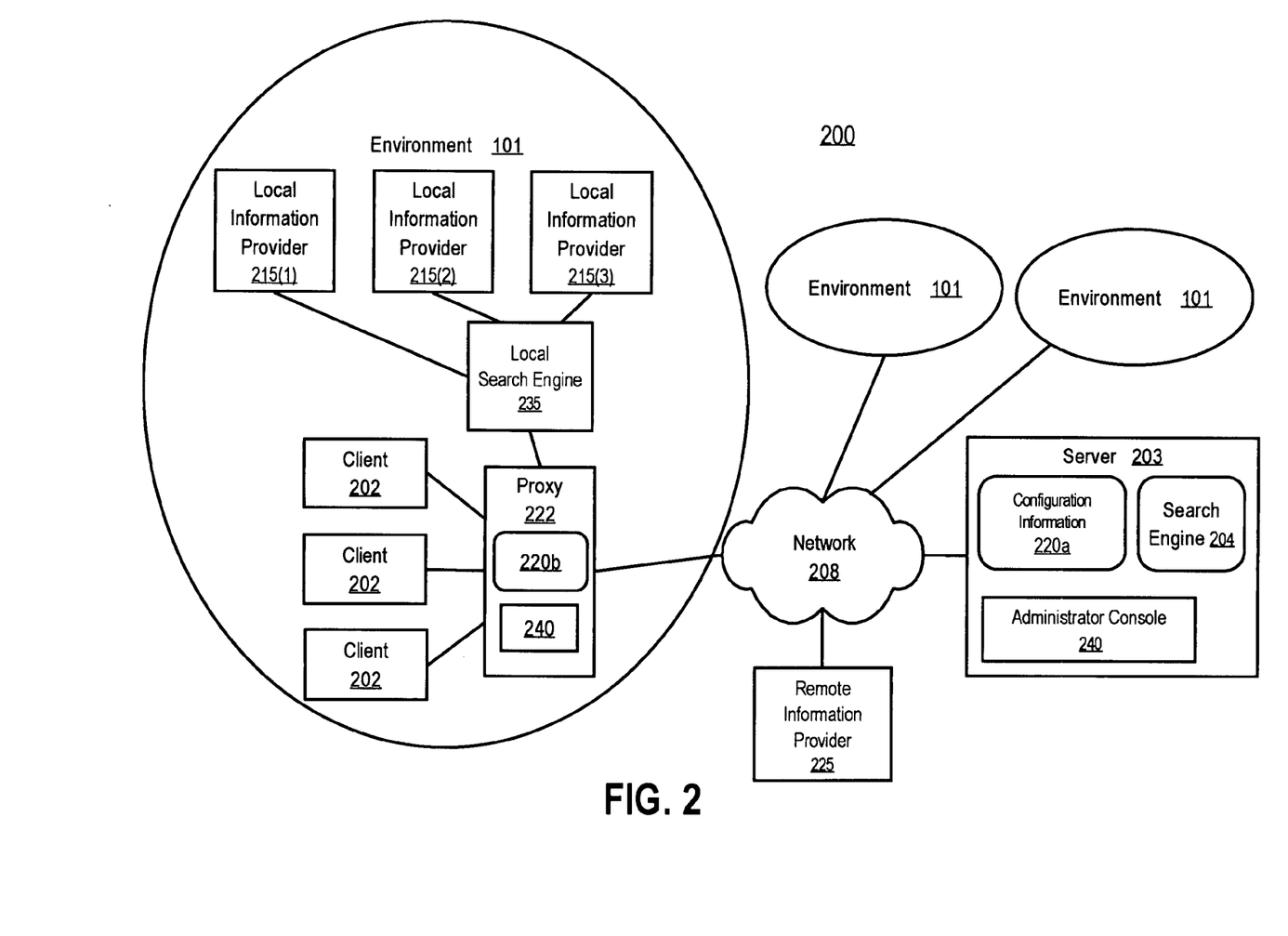
FIG. 2 illustrates a system for configuring a search engine results page with environment specific information, in accordance with an embodiment of the present invention.

System for Configuring Search Engine Results Page with Environment Specific Information FIG. 2 illustrates a system 200 for configuring a SERP with environment specific information, in accordance with an embodiment of the present invention. Clients 202 are communicatively coupled to the server 203 via network 208. Network 208 may be the Internet, although this is not required. The server 203 has search engine 204 that is able to perform a search of the World Wide Web, in one embodiment.

The system 200 has several environments 101 for which environment specific SERPs are configured. As used herein, the term "environment" means any set of electronic devices under common administration. An environment may include electronic devices that belong to a given environment. The electronic devices may or may not be use the same hardware or run the same software. Examples of electronic devices include, but are not limited to, a web-enabled cellular telephone, a web-enabled personal digital assistant, a server running a particular operating system (e.g., Linux®, Solaris®), a personal computer running the Windows® operating system, etc. In FIG. 2, the clients 202 are electronic devices under common administration.

An environment 101 may have a device that controls access to the environment. In one embodiment, the environment has a proxy 222 with a firewall to perform the access control. An administrator for the environment 101 may control what software is loaded on the clients 202. An example of an environment 101 is a home, where the administrator may be any resident thereof, and the end users are the family members. Another example of an environment 101 is a corporation, where the administrator is the information technology (IT) manager, and the end users are employees of the company. Still another example of an environment 101 is a business, such as an Internet café, where the administrator may be the proprietor, and the end users are customers.

The administration console 240 has a user interface that allows an administrator for the environment 101 to provide configuration information to configure environment specific SERPs 100. The administration console 240 may be hosted by the server 203 or a proxy 222. The configuration information is stored in configuration information 220, which may be stored at either or both of the server 203 and the proxy 222. The configuration information 220 describes how a SERP should be configured for each particular environment.

When a client 202 sends a request including a search query to the server 203, the proxy 222 modifies the request to instruct the server 203 that an environment specific SERP 100 is desired, in one embodiment. The proxy 222 modifies the request by adding a token such as a proxy ID, in one embodiment. In order to determine how to configure an environment specific SERP 100, the server 203 accesses the configuration information 220a, in one embodiment.

When the proxy 222 receives the environment specific SERP 100 from the server 203, the proxy 222 might make additional changes to the environment specific SERP 100 before returning the environment specific SERP 100 to the client 202. In order to determine how to configure an environment specific SERP 100, the proxy 222 accesses the configuration information 220b, in one embodiment.

The proxy 222 is communicatively coupled to local search engine 235 to enable the proxy 222 to obtain additional search results to insert into the environment specific SERP 100. The local search engine 235 is able to search the local information providers 215(1)-215(3). As an example, a local information provider (e.g., 215(1)) might be a company database. The proxy 222 can also access remote information provider 225 via network 208 in order to obtain search results or other information to insert into the environment specific SERP 100. Thus, note that the information that is inserted into the environment specific SERP 100 is not limited to information that originated from the environment 101.

Example User Interface

Figure 3:
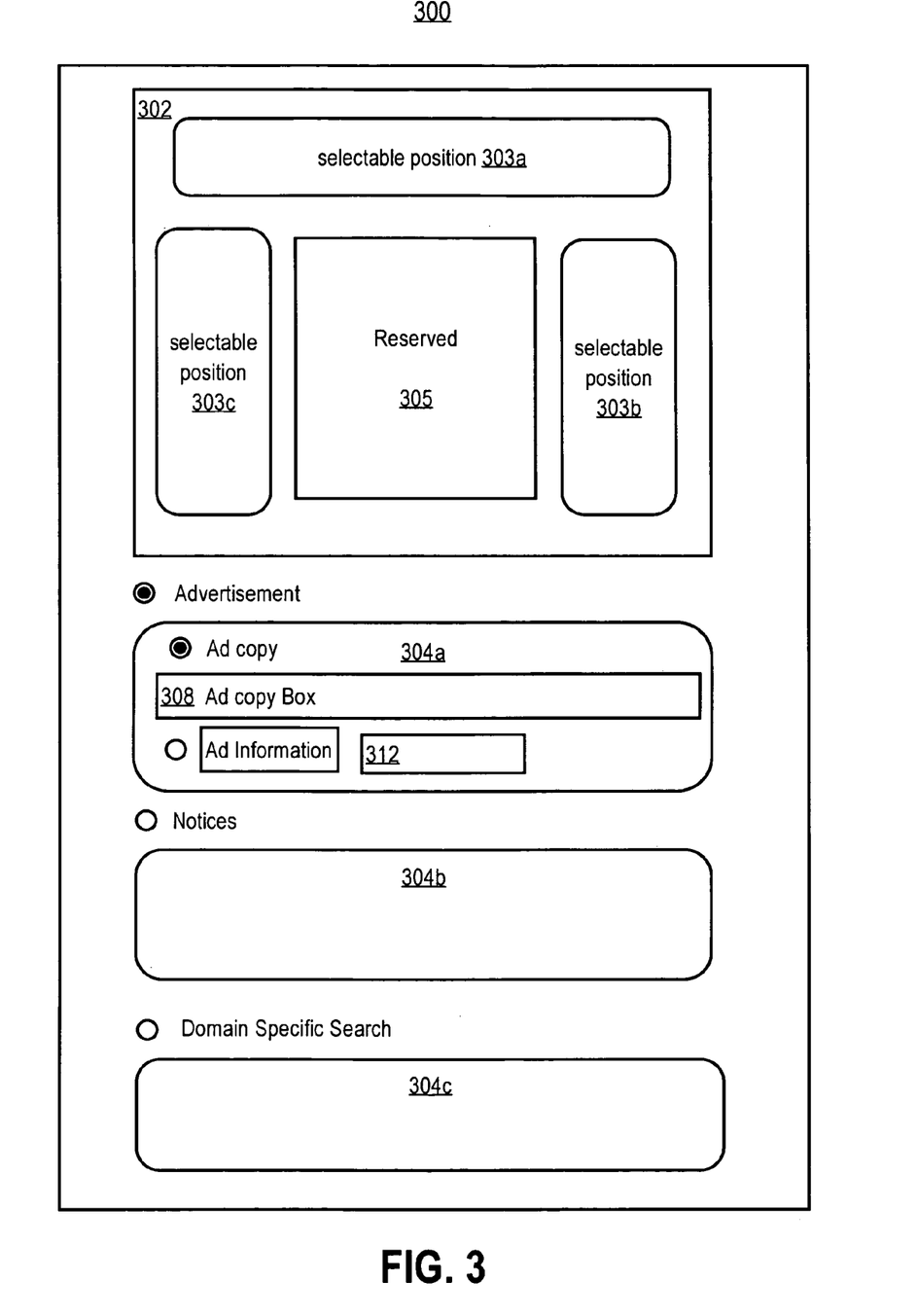
FIG. 3 is an example user interface for providing information to configure a search engine results page with environment specific information, in accordance with an embodiment of the present invention.

FIG. 3 is an example user interface 300 of for providing configuration information 220 to configure an environment specific SERP 100, in accordance with an embodiment of the present invention. The user interface 300 may be part of an administrator console 240. As previously discussed, the administrator console 240 may be hosted by the server 203, or by a proxy 222. If the proxy 222 hosts the administrator console 240, the proxy 222 may store the configuration information 220 locally, or forward the configuration information on to the server 203.

The example user interface 300 has a position region 302 for specifying positions on the environment specific SERP 100 that content is to be positioned, content description regions 304 for describing content to be inserted into the positions, and a reserved region 305. The reserved region 305 may be for search result items; however, other content can go into the reserved region 305. The configuration information 220 is based on information entered into the position region 302 and the content description regions 304, in one embodiment.

The position region 302 depicts three different selectable positions 303a, 303b, 303c. An administrator may select any of the positions 303 to indicate that the administrator wishes to specify content for that position 303. In one embodiment, the positions 303 may be re-sized. For example, a position 303 can be selected and then re-sized by dragging a mouse cursor. In one embodiment, the positions 303 may be moved. Additional positions 303 can be added to the environment specific SERP 100, and unused positions 303 may be removed.

The content description regions 304a, 304b, 304c allow the administrator to either directly describe content or provide information to derive content for the selected position 303. For example, the administrator selects one of the positions (e.g., 303a) to indicate that information provided in one or more of the content description regions 304a, 304b, 304c is to be used in connection with generating content for selected position 303a.

The various content regions 304 will now be described. The administrator selects the "Advertisement" button to indicate that information entered into the advertisement content region 304a is to be used to generate one or more advertisements to be put in the currently selected position 303a. The administrator can select the "Ad copy" button and then enter copy for the advertisement directly into the advertisement content box 308. As an example of advertising content, if the environment is an Internet Café, advertisements for a hotel across the street could be entered into the advertisement content box 308. Because these advertisements are targeted to users very near the hotel, they are also likely to be highly relevant. The advertisement copy can include text and graphics.

Alternatively, the administrator can select the "Ad Information" button and then provide information that can be used to derive advertising content. As an example, the administrator can provide a zip code or other location information in the advertisement configuration box 312. For example, the administrator might provide a description such as "Times Square, New York".

Many variations of the advertisement content region 304a are possible. For example, the region 304a may allow restrictions to be placed on the advertising content. An example of a restriction is that certain types of advertisements (e.g., those with adult content) should not be included.

After specifying information to derive environment specific content for position 303a, the administrator may then select another position 303 (e.g., 303b). To specify information for this currently selected position 303b, the administrator may select the "Notices" button to indicate that information entered into the notice region 304b is to be used to generate one or more notices to be put in the currently selected position 303b. An example of special notice is a notice to employees about an upcoming enrollment deadline.

After providing information to derive environment specific content for position 303b, the administrator may then select another position 303 (e.g., 303c). To specify information for this currently selected position 303c, the administrator may select the "Domain Specific Search" button to indicate that information entered into the domain search region 304c is to be used to generate domain specific search results to be put in the selected position. As an example, the administrator might provide a URL of a domain over which the domain specific search is to be conducted. Details of conducting a domain specific search are discussed below.

Note that some of the positions 303 can be used as placeholders without specifying the information to derive the environment specific content. For example, if the administrator desires that the proxy 222 insert environment specific content, the administrator might indicate that a particular position is to be used as a placeholder, wherein when responding to search queries the server 203 returns an environment specific SERP 100 that allows the proxy 222 to insert environment specific content into the placeholder. Variations of the user interface 240 are possible in which other types of environment specific content may be entered.

Process Flow for Establishing Configuration Information

Figure 4:
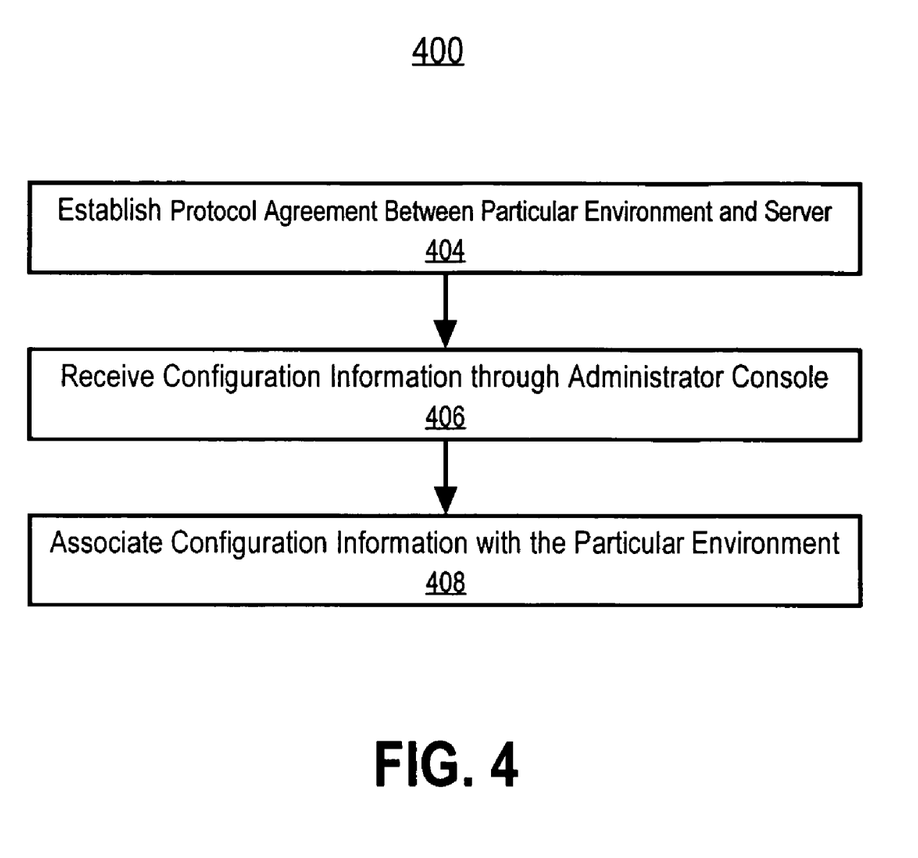
FIG. 4 is a flowchart illustrating a process of providing information to configure a search engine results page with environment specific information, in accordance with an embodiment of the present invention.

FIG. 4 is a flowchart illustrating a process 400 of establishing configuration information 220 for an environment specific SERP 100, in accordance with an embodiment of the present invention. FIG. 4 will be described with reference to the example environment specific SERP 100 of FIG. 1, the system 200 of FIG. 2 and the example user interface 300 of FIG. 3. However, the process 400 of FIG. 4 is not limited to any of these.

In step 404, an agreement is reached for a protocol to be used between the particular environment 101 and the server 203 during the overall process of configuring the environment specific SERP 100. The administrator console 240 may have an interface (not depicted in FIG. 3) for establishing protocol information; however, at least some of the protocol information can be provided by other techniques. A purpose of the protocol is for the server 203 to validate that requests from the proxy 222 are indeed originating from the particular environment 101. Thus, in one embodiment, the proxy 222 and the server 203 exchange a secret shared key to be used later in authentication and verification of the source of requests. The server 203 may also be provided with an environment identifier, such as a proxy ID, which can be used to verify requests. The environment identifier may be implicit, however. For example, the server 203 can identify the proxy 222 based on its Medium Access Control (MAC) address. In one embodiment, contractual terms and conditions between an entity controlling the particular environment 101 and an entity controlling the server 203 are agreed to at the time the protocol is established. However, the contractual terms and conditions can be agreed to at another time.

In step 406, the administrator enters configuration information 220 into the administrator console 240. Examples of configuration information 220 have already been described with respect to the user interface 300 depicted in FIG. 3.

In step 408, the configuration information 220 is associated with the particular environment 101. For example, if the server 203 is hosting the administrator console 240, the server 203 stores the configuration information 220, alone with the environment identifier from step 402. If the proxy 222 is hosting the administrator console 240, the proxy 222 may forward the configuration information 220, or at least portions thereof, to the server 203. However, it is not required that the proxy 222 forward the configuration information 220 to server 203.

Figure 5:
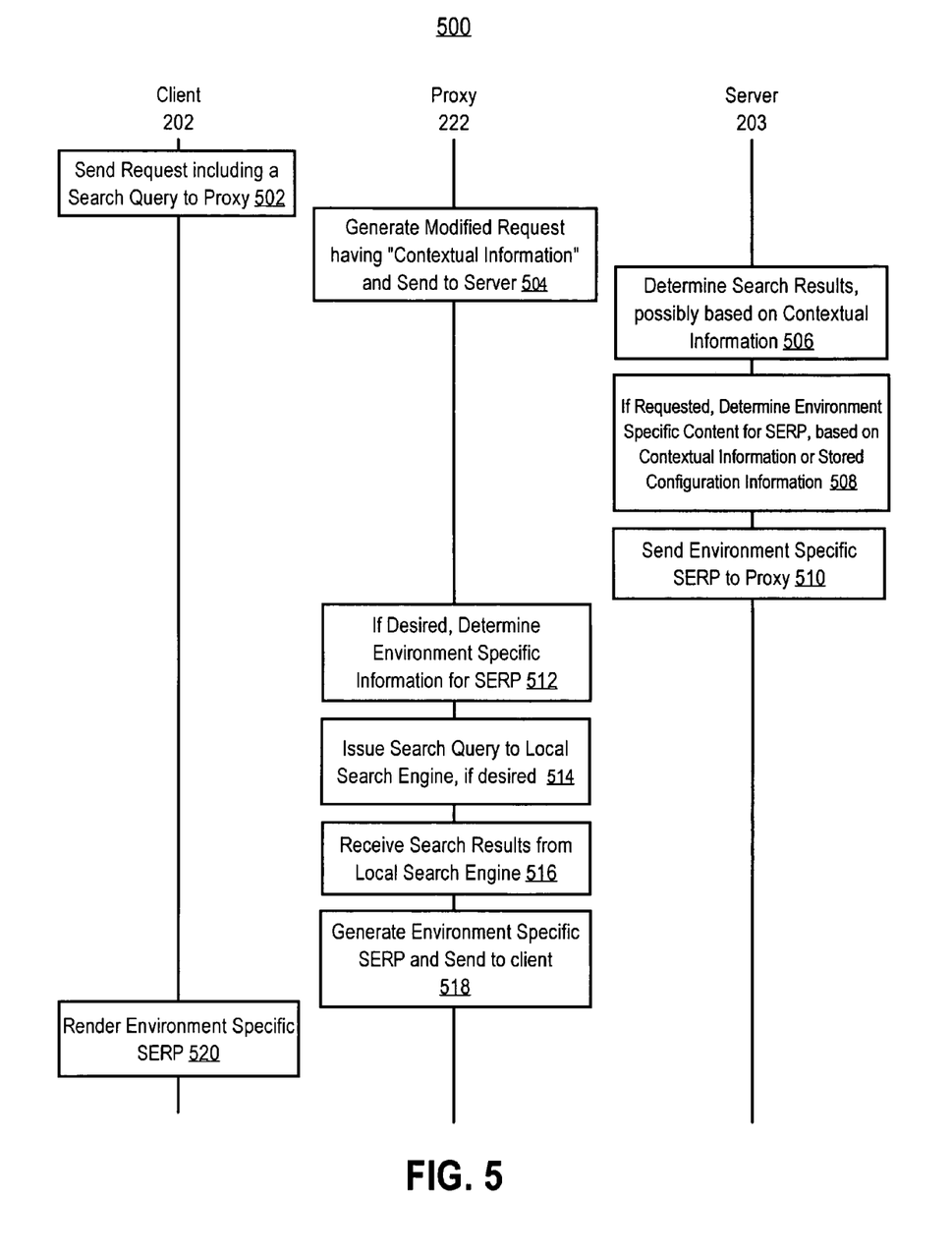
FIG. 5 is a flowchart illustrating configuring a search engine results page having environment specific information, in accordance with an embodiment of the present invention.

Process Flow for Providing a Search Engine Results Page Having Environment Specific Information FIG. 5 is a flowchart illustrating a process 500 of configuring a SERP 100 with environment specific information, in accordance with an embodiment of the present invention. FIG. 5 will be described with reference to the example environment specific SERP 100 of FIG. 1, the system 200 of FIG. 2 and the example user interface 300 of FIG. 3. However, the process 500 of FIG. 5 is not limited to any of these.

In step 502, the client 202 sends a request containing a search query to the proxy 222, in response to user input at the client 202. For example, the client 202 may send an HTTP request. In step 504, the proxy 222 generates a modified request. The modified request may contain an environment identifier. However, the environment identifier could also be implicit (e.g., a MAC address). The modified request may contain "contextual information." The contextual information is any information that could be used by the server 203 to configure the environment specific SERP 100. Examples of contextual information include, but are not limited to, an environment identifier, a user identifier, and a user role. The proxy 222 could include many other types of contextual information in the modified request. In one embodiment, the proxy 222 modifies the header of an HTTP request from the client 202 to generate the modified request.

In step 506, the server 203 determines search results, possibly based on the contextual information in the modified request. As an example, if the role of the user is a pharmaceutical worker, then search results related to the pharmaceutical industry can be ranked more highly. However, it is not required that the search results be based on the contextual information.

In step 508, the server 203 determines environment specific content for the environment specific SERP 100, if requested by the proxy 222. For example, the server 203 may determine what advertisements to insert into the environment specific SERP 100. It is not required that the server 203 perform step 508. For example, the server 203 may return a SERP with placeholders for environment specific content, which allows the proxy 222 to insert the environment specific content. The server 203 may determine the environment specific content, if any, based on the contextual information in the request or based on stored configuration information 220. In step 510, the server 203 sends the environment specific SERP 100 to the proxy 222.

In step 512, the proxy 222 determines environment specific content for the environment specific SERP 100, if desired. As previously mentioned, the environment specific SERP 100 may have placeholders, which the proxy 222 fills with environment specific content. The proxy 222 may determine the environment specific content, if any, based on stored configuration information 220 at the proxy 222. An example of a proxy 222 inserting environment specific content is a case in which the environment 101 is an Internet Café and the proxy 222 inserts a notice showing the time the user has left in their account. Note that this mechanism allows for "dynamically" adding content to the environment specific SERP 100. In contrast, if the stored configuration information 220 is used, then "static" content is added to the environment specific SERP 100.

As previously discussed, the user interface 300 allows a domain specific search to be specified. In step 514, the proxy 222 issues a search query to the local search engine 235, if a domain specific search is to be conducted. This search query may contain the same terms that were included in the search query submitted by the client 102 in step 502; however, using the exact same search terms is not required. In step 516, the proxy 222 receives the search results from the local search engine 235.

Note that the transactions for the domain specific query may stay within the environment 101. In other words, the domain specific query and domain specific results do not need to leave the confines of the environment 101, which alleviates security/privacy concerns. However, if desired, the domain for the domain specific search may be external to the environment 101. For example, the domain specific search might include a search query sent to remote information provider 225.

In step 518, the proxy 222 generates the environment specific SERP 100 and sends it to the client 202. In step 520, the client 202 renders the environment specific SERP 100.

Hardware Overview

Figure 6:
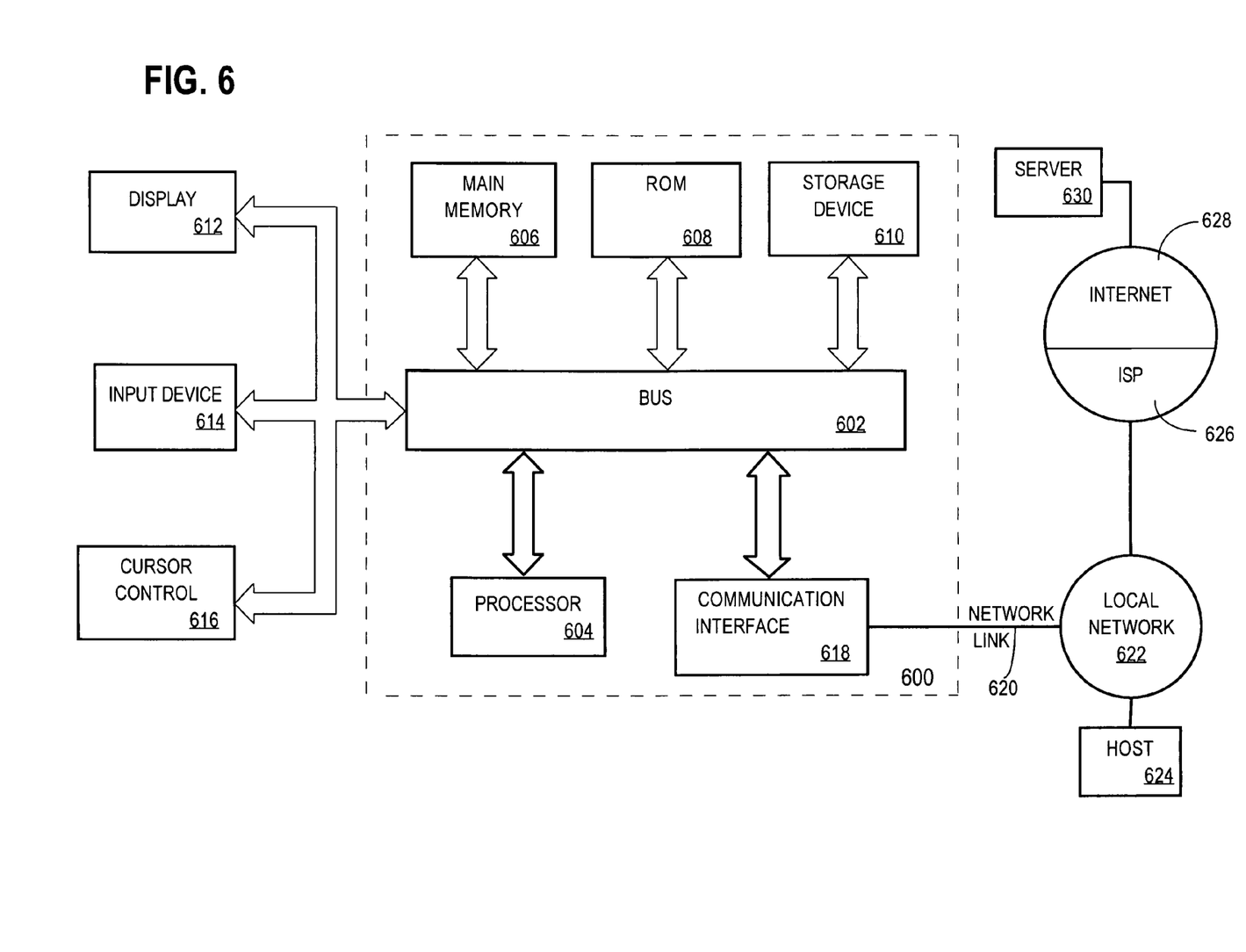
FIG. 6 is a block diagram that illustrates a computer system upon which embodiments of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   receiving at a proxy a request from a client;
      wherein the request comprises a search query submitted by a user;
   the proxy performing a modification to the request to generate a modified request, wherein the modification includes adding to the request a proxy identifier that uniquely identifies the proxy, wherein the modification is performed by the proxy without regard to the content of the request from the client;
   the proxy forwarding the modified request to a search engine, wherein the proxy identifier in the modified request indicates to the search engine a particular proxy-specific customization to apply to a search engine results page to generate a customized search engine results page, wherein the particular proxy-specific customization is one of a plurality of proxy-specific customizations, wherein each of the plurality of proxy-specific customizations is mapped to a corresponding proxy identifier;
   receiving at the proxy, from the search engine, the customized search engine results page having (a) search result items that match the search query and (b) the particular proxy-specific customization, wherein the particular proxy-specific customization includes at least one of:
      proxy-specific information; or
      placeholders for proxy-specific information; and
   wherein the method is performed by one or more computing devices.

2. The method of claim 1, wherein:
   the search results page received from the search engine includes proxy-specific information; and
   wherein the modification includes adding contextual information to allow the search engine to determine the proxy-specific information.

3. The method of claim 1, wherein:
   the search results page received from the search engine includes placeholders for proxy-specific information; and
   further comprises:
      based on stored configuration information associated with the proxy, the proxy inserting proxy-specific content in one or more of the placeholders.

4. The method of claim 1, further comprising:
   positioning the placeholders in particular positions in the customized search engine results page based on stored configuration information that is associated with the proxy.

5. The method of claim 1, further comprising:
deriving the proxy-specific information based on stored configuration information that is associated with the proxy; and
positioning the proxy-specific information in particular positions in the search engine results page based on the stored configuration information.

6. The method of claim 1, further comprising:
after receiving the customized search engine results page, deriving proxy-specific information;
inserting the proxy-specific information into one or more of the placeholders; and
after inserting the proxy-specific information, providing the search engine results page to the client.

7. The method of claim 1, wherein deriving proxy-specific information comprises accessing stored configuration information.

8. The method of claim 1, further comprising:
based on information contained within the customized search engine results page returned from the search engine, initiating a domain specific search; and
positioning search results from the domain specific search into one or more of the placeholders.

9. A method comprising:
receiving at a search engine a modified request sent from a proxy, wherein the proxy, before sending the modified request to the search engine, performed a modification to a request received from a client to generate the modified request, wherein the request comprises a search query submitted by a user, wherein the modification included adding to the request a proxy identifier that uniquely identifies the proxy, wherein the modification was performed by the proxy without regard to the content of the request from the client;
in response to receiving the modified request and without regard to the content of the request sent by the client, the search engine selecting a particular proxy-specific customization for a search engine results page based on the proxy identifier included in the modified request, wherein the particular proxy-specific customization is selected from a mapping of each of a plurality of proxy identifiers to a corresponding proxy-specific customization;
the search engine determining how to customize the search engine results page to generate a customized search engine results page based on the particular proxy-specific customization;
the search engine generating a customized search engine results page having (a) search result items that match the search request and (b) the particular proxy-specific customization, wherein the particular proxy-specific customization includes at least one of:
proxy-specific information; or
placeholders for proxy-specific information;
sending the customized search engine results page from the search engine to the proxy; and
wherein the method is performed by one or more computing devices.

10. The method of claim 9, further comprising:
receiving, from an administrator user interface, new proxy-specific search engine results page customization information and a particular proxy identifier, wherein the new proxy-specific search engine results page customization information comprises proxy-specific content information and proxy-specific content position information for customizing search engine results pages requested by clients through a particular proxy identified by the particular proxy identifier;
storing data mapping the new proxy-specific search engine results page customization information to the particular proxy identifier.

11. The method of claim 9, further comprising:
receiving, from a particular proxy, new proxy-specific search engine results page customization information and a particular proxy identifier uniquely identifying the particular proxy, wherein the new proxy-specific search engine results page customization information comprises proxy-specific content information and proxy-specific content position information for customizing search engine results pages requested by clients through the particular proxy identified by the particular proxy identifier;
storing data mapping the new proxy-specific search engine results page customization information to the particular proxy identifier.

12. The method of claim 1, further comprising:
receiving, at the proxy from an administrator user interface, new proxy-specific search engine results page customization information, wherein the new proxy-specific search engine results page customization information comprises proxy-specific content information and proxy-specific content position information for customizing search engine results pages requested by clients through the proxy;
transmitting the new proxy-specific search engine results page customization information and the proxy identifier to the search engine.

13. A computer-readable storage medium storing one or more sequences of instructions that, when executed on one or more processors, causes the processors to perform a method comprising:
receiving at a proxy a request from a client;
wherein the request comprises a search query submitted by a user;
the proxy performing a modification to the request to generate a modified request, wherein the modification includes adding to the request a proxy identifier that uniquely identifies the proxy, wherein the modification is performed by the proxy without regard to the content of the request from the client;
the proxy forwarding the modified request to a search engine, wherein the proxy identifier in the modified request indicates to the search engine a particular proxy-specific customization to apply to a search engine results page to generate a customized search engine results page, wherein the particular proxy-specific customization is one of a plurality of proxy-specific customizations, wherein each of the plurality of proxy-specific customizations is mapped to a corresponding proxy identifier;
receiving at the proxy, from the search engine, the customized search engine results page having (a) search result items that match the search query and (b) the particular proxy-specific customization, wherein the particular proxy-specific customization includes at least one of:
proxy-specific information; or
placeholders for proxy-specific information; and
wherein the method is performed by one or more computing devices.

14. A computer-readable storage medium storing one or more sequences of instructions that, when executed by one or more processors, causes the processors to perform a method comprising:

- receiving at a search engine a modified request sent from a proxy, wherein the proxy, before sending the modified request to the search engine, performed a modification to a request received from a client to generate the modified request, wherein the request comprises a search query submitted by a user, wherein the modification included adding to the request a proxy identifier that uniquely identifies the proxy, wherein the modification was performed by the proxy without regard to the content of the request from the client;
- in response to receiving the modified request and without regard to the content of the request sent by the client, the search engine selecting a particular proxy-specific customization for a search engine results page based on the proxy identifier included in the modified request, wherein the particular proxy-specific customization is selected from a mapping of each of a plurality of proxy identifiers to a corresponding proxy-specific customization;
- the search engine determining how to customize the search engine results page to generate a customized search engine results page based on the particular proxy-specific customization;
- the search engine generating a customized search engine results page having (a) search result items that match the search request and (b) the particular proxy-specific customization, wherein the particular proxy-specific customization includes at least one of:
  - proxy-specific information; or
  - placeholders for proxy-specific information;
- sending the customized search engine results page from the search engine to the proxy; and
- wherein the method is performed by one or more computing devices.

* * * * *